(12) United States Patent
Kirovski

(10) Patent No.: US 7,680,277 B2
(45) Date of Patent: Mar. 16, 2010

(54) OPTICAL MEDIA PROTECTION METHODS AND APPARATUSES

(75) Inventor: Darko Kirovski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1889 days.

(21) Appl. No.: 10/706,305

(22) Filed: Nov. 12, 2003

(65) Prior Publication Data

US 2005/0099612 A1    May 12, 2005

(51) Int. Cl.
*H04N 7/167* (2006.01)
*G06F 11/30* (2006.01)

(52) U.S. Cl. ............... 380/201; 713/156; 713/165; 713/173; 713/175; 713/176; 713/193; 713/194; 726/2; 726/5; 726/26; 726/30; 726/31; 726/32; 720/718; 720/719; 369/283; 369/284; 369/285; 369/286; 369/288; 380/202; 380/203; 359/1; 359/2; 359/3

(58) Field of Classification Search ............ 380/201
See application file for complete search history.

(56) References Cited

U.S. PATENT DOCUMENTS

| | | | | |
|---|---|---|---|---|
| 5,572,589 | A * | 11/1996 | Waters et al. ............ 705/58 |
| 5,809,006 | A * | 9/1998 | Davis et al. ............ 369/47.49 |
| 5,963,536 | A * | 10/1999 | Vasic et al. ............ 369/275.3 |
| 6,487,155 | B1 * | 11/2002 | Carson et al. ............ 369/59.13 |
| 2002/0069389 | A1 * | 6/2002 | Sollish et al. ............ 714/758 |
| 2002/0076046 | A1 * | 6/2002 | Heylen ............ 380/203 |
| 2003/0053656 | A1 * | 3/2003 | Levy ............ 382/100 |
| 2003/0118208 | A1 * | 6/2003 | Epstein ............ 382/100 |
| 2003/0120946 | A1 * | 6/2003 | Epstein ............ 713/200 |
| 2005/0246777 | A1 * | 11/2005 | Fontijn et al. ............ 726/27 |

* cited by examiner

*Primary Examiner*—Edan Orgad
*Assistant Examiner*—Jenise E Jackson
(74) *Attorney, Agent, or Firm*—Lee & Hayes, PLLC

(57) ABSTRACT

Methods and apparatuses are provided for use with optical data storage media and related devices.

30 Claims, 7 Drawing Sheets

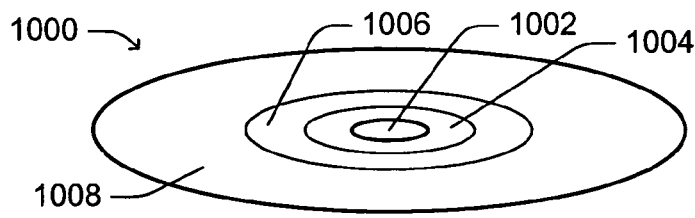
Fig. 10 (Prior Art)
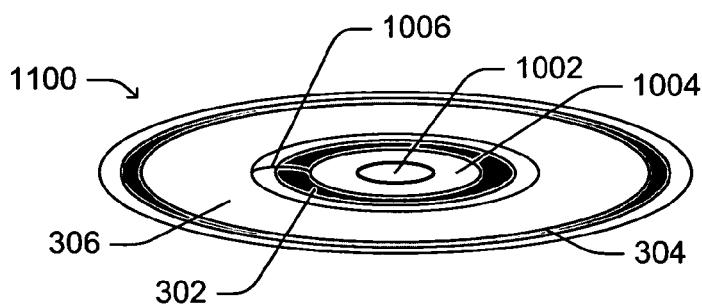
(a)
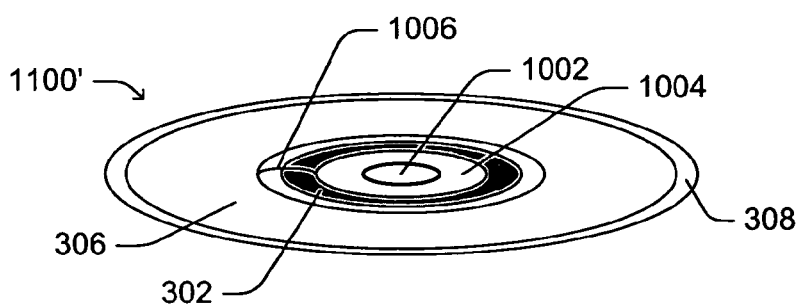
(b)
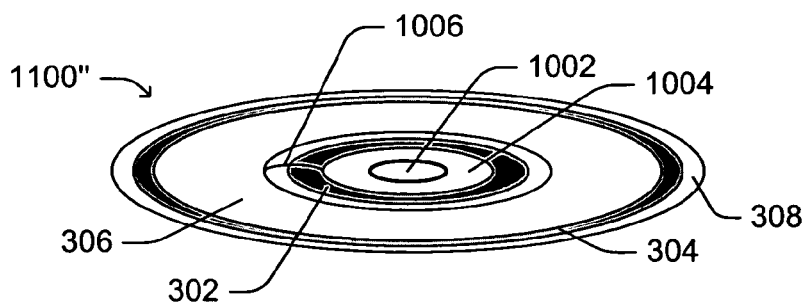
(c)
Fig. 11

OPTICAL MEDIA PROTECTION METHODS AND APPARATUSES

TECHNICAL FIELD

The present invention relates generally to optical media and related devices, and more particularly to improved optical media and methods and apparatuses related thereto.

BACKGROUND

Optical data storage media, such as, for example, compact discs and digital versatile discs are used to share a wide variety of data content. Music, movies and software are prime examples of the type of data one finds on individually-recorded and mass produced optical discs.

With the proliferation of such media and reading and writing devices there is a need to manage the digital and other rights that certain entities have in the recorded content on the discs. While data protection schemes have been used, there is, unfortunately, a thriving illegal data piracy market to which many of data protection schemes have fallen due to hacking efforts. Moreover, many of the protection schemes that have been used needed to only be broken once by a hacker who then shares the learned secrets of the protection scheme with others.

Consequently, there is a continuing need for improved methods and apparatuses for use in protecting data content stored on optical data storage media.

SUMMARY

The above-stated needs and others are met, for example by an improved optical data storage medium is that has instructional data for an optical media content protection scheme built-in. The instructional data (e.g., software) is configured to cause programmable logic within the reading device to operatively perform in accordance with the content protection scheme and to control access to the content data stored on the optical data storage medium accordingly. The content protection scheme may include, for example, a digital rights management (DRM) protection scheme, a marking scheme (e.g., a data-implemented water marking scheme, a data-implemented forensic marking scheme, etc.), and/or other like schemes.

The instructional data and/or the entire optical data storage medium can be verified based on at least one optically-detectable authentication feature and related information stored on the storage medium. Here, for example, the optically-detectable authentication feature may include a plurality of optically-detectable authentication features forming a substantially unique pattern using at least one optically detectable material. In certain implementations, such authentication features form an optically-detectable certificate of authentication (COA) that can be "read" and compared to related COA information data stored on the storage medium.

In accordance with certain implementations, another improved optical data storage medium is provided that includes optically-readable material suitable for storing data therein, and at least one optically-detectable non-data-based, physical authentication feature having a substantially unique pattern and comprising at least one optically detectable material.

An exemplary apparatus includes a means for storing instructional data for an optical media content protection scheme within an optical data storage medium, the instructional data being configured to cause logic associated with an optical media receiving device to operate in accordance with the optical media content protection scheme when programmed using the instructional data and accessing associated content data stored on the optical data storage medium.

Another exemplary apparatus includes a means for forming at least one optically-detectable non-data-based, physical authentication feature as part of an optical data storage medium, the authentication feature having a substantially unique pattern and comprising at least one optically detectable material.

Yet still another apparatus includes a data storage device that is configurable to write data to an optical data storage medium, and logic configured to cause the data storage device to record instructional data for an optical media content protection scheme within the optical data storage medium. Here, the instructional data is configured to cause logic associated with an optical media receiving device to operate in accordance with the optical media content protection scheme when programmed using the instructional data and accessing associated content on the an optical data storage medium.

Another apparatus includes an authentication feature forming mechanism configured to apply authentication feature forming material to an optical data storage medium so as to form at least one optically-detectable non-data-based, physical authentication feature as part of the optical data storage medium. Here, the authentication feature has a substantially unique pattern and is made using at least one optically detectable material.

In another exemplary method, instructional data is stored for an optical media content protection scheme within an optical data storage medium. The instructional data is configured to cause logic associated with an optical media receiving device to operate in accordance with the optical media content protection scheme when programmed using the instructional data and accessing associated content data stored on the optical data storage medium.

In still another implementation, a method is provided that includes forming at least one optically-detectable non-data-based, physical authentication feature as part of an optical data storage medium. Here, the authentication feature has a substantially unique pattern.

A computer-readable medium is also provided. The computer-readable medium includes computer-implementable instructions for causing at least one processor to write instructional data for an optical media content protection scheme to an optical data storage medium. Here, the instructional data being configured to cause logic associated with an optical media receiving device to operate in accordance with the optical media content protection scheme when programmed using the instructional data and accessing associated content data stored on the optical data storage medium.

Another exemplary apparatus includes non-volatile memory, an interface mechanism and logic. The interface mechanism is suitable for receiving a removable optical data storage medium, accessing instructional data associated with an optical media content protection scheme from the optical data storage medium, and outputting the accessed instructional data. The logic is operatively coupled to the interface mechanism and the non-volatile memory and configured to receive the accessed instructional data and in response thereto update a current optical media content protection scheme stored in the non-volatile memory and thereafter while accessing associated content data stored on the optical data storage medium operatively adhere to the updated current optical media content protection scheme.

A different apparatus includes an interface mechanism and logic. Here, an interface mechanism suitable for receiving a removable optical data storage medium, accessing and outputting data stored thereon, and detecting at least one optically-detectable authentication feature that is part of the optical data storage medium and outputting corresponding authentication feature information. The logic is operatively coupled to the interface mechanism and configured to receive the accessed data and the authentication feature information and in response thereto determine if content data stored on the optical data storage medium can be accessed.

Another method includes reading instructional data associated with an optical media content protection scheme from an optical data storage medium, updating a current optical media content protection scheme based on the instructional data, and determining if a valid license exists prior to accessing associated content data stored on the optical data storage medium.

Certain other methods include receiving a removable optical data storage medium, detecting at least one optically-detectable authentication feature that is part of the optical data storage medium, outputting authentication feature information, and determining if content data stored on the optical data storage medium can be accessed based at least in part on the authentication feature information.

BRIEF DESCRIPTION OF THE DRAWINGS

A more complete understanding of the various methods and apparatuses of the present invention may be had by reference to the following detailed description when taken in conjunction with the accompanying drawings wherein:

FIG. 10 is an illustrative diagram depicting a conventional optical media in the form of a disc.

FIGS. 11(a-c) are some illustrative diagrams depicting exemplary improved optical media in the form of discs.

DETAILED DESCRIPTION

Figure 1:
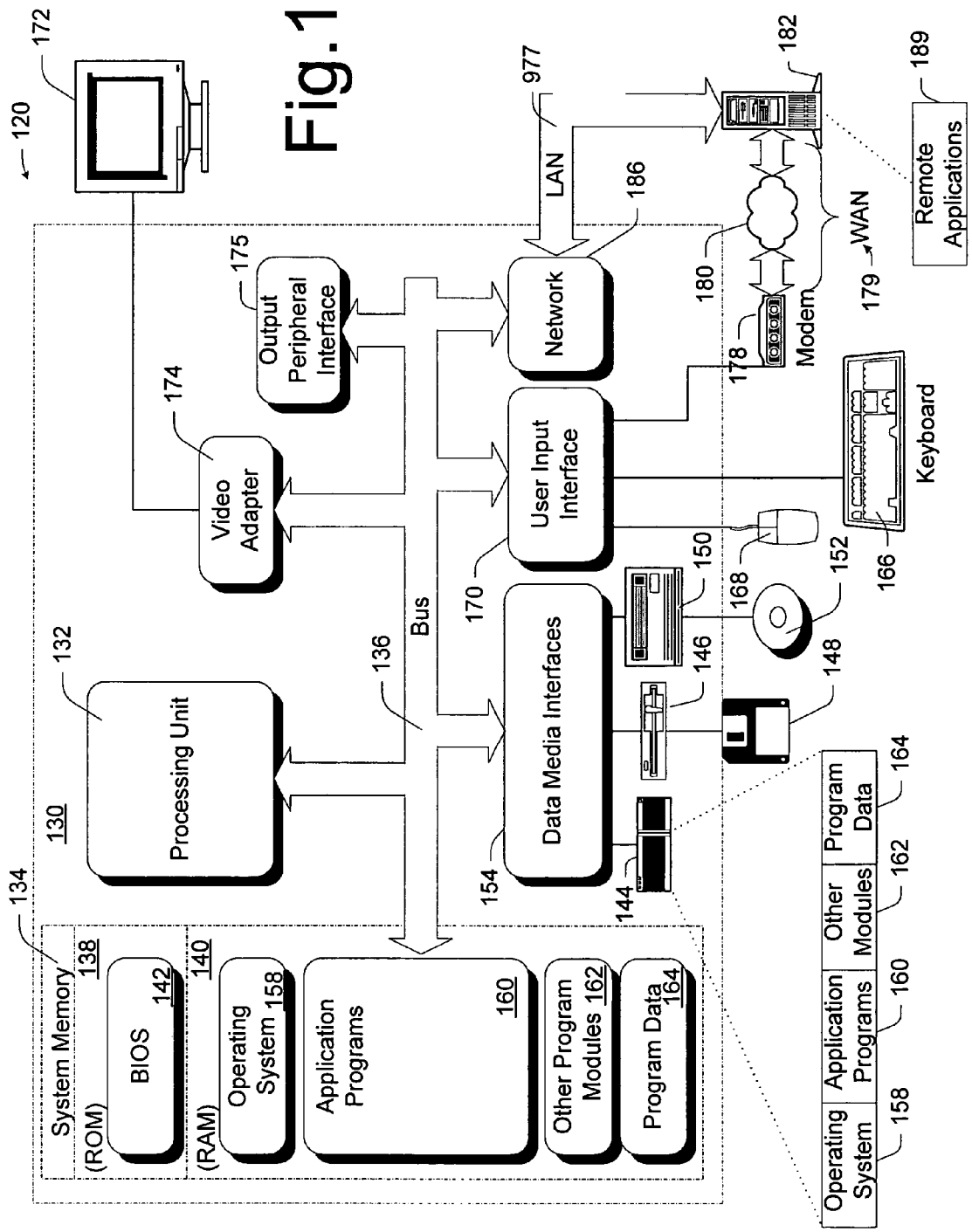
FIG. 1 is a block diagram that depicts an exemplary system that can be used with and/or to form improved optical media, the device in this example takes the form of a computer.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and apparatuses may be implemented.

Exemplary computing environment 120 is only one example of a suitable computing environment and is not intended to suggest any limitation as to the scope of use or functionality of the improved methods and apparatuses described herein. Neither should computing environment 120 be interpreted as having any dependency or requirement relating to any one or combination of components illustrated in computing environment 120.

The improved methods and apparatuses herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and apparatuses described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
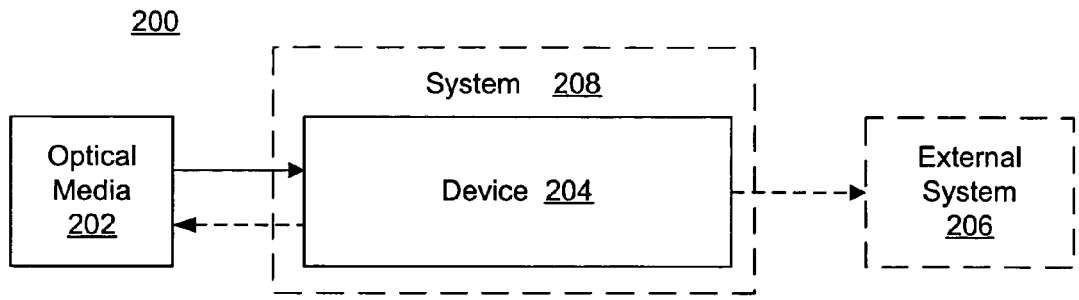
FIG. 2 is a block diagram depicting an exemplary system for use with the improved optical media; the arrangement may include a computer and/or other types of devices/appliances.

Attention is now drawn to FIG. 2, which is a block diagram depicting an exemplary arrangement/system for use with the improved optical media as described herein. This arrangement may include, for example, a computer as in FIG. 1 and/or other types of devices/appliances. The methods and apparatuses herein are not limited to computer or other like devices, and are clearly adaptable to any device or system that uses optical data storage media. As used herein an optical data storage medium may take any applicable form, and may include conventional forms, such as, for example, a compact disc (CD), a CD-ROM, a CD-R, a CD+R, a CD-RW, a CD+RW, a writable CD, a re-writable CD, a digital versatile disc (DVD), a DVD-RAM, a DVD-ROM, a DVD-R, a DVD+R, a DVD-RW, a DVD+RW, a writable DVD, a re-writable DVD, a laser disc, a non-disc optically-readable data storage medium, and/or the like.

Turning to FIG. 2, exemplary arrangement 200 includes an optical data storage medium (optical media) 202, a device 204, an external system 206 and a system 208. As mentioned above optical media 202 may take various forms. Device 204 is representative of any applicable device that is configured to interface with optical media 202. Thus, for example, device 204 may take the form of a CD or DVD player/reader/writer, etc. At a minimum, however, device 204 is configured to read data stored on optical media 202. System 208 may include, for example, a computer, stereo, television, etc., having a device 204 therein.

External system 206 is illustrative of potential exemplary implementations wherein device 204 may be remote to other devices/systems. Hence, for example, device 204 may be connected to external system 206 via a network, wireless link, etc. Logic within device 204 may interact with logic within external system 206 through such connections. One example, is where external system 206 is operatively involved in helping device 204 and/or system 208 to determine is certain digital rights management (DRM), copyright or other like licenses exist for a given user, device, medium, content, period of time, etc. External device 206 may support the distribution of cryptography related information, such as, e.g., distribution of private and public keys, authenticating users, accounts, and the like. Here, external system 206 may include a "trusted source", for example.

Figure 3:
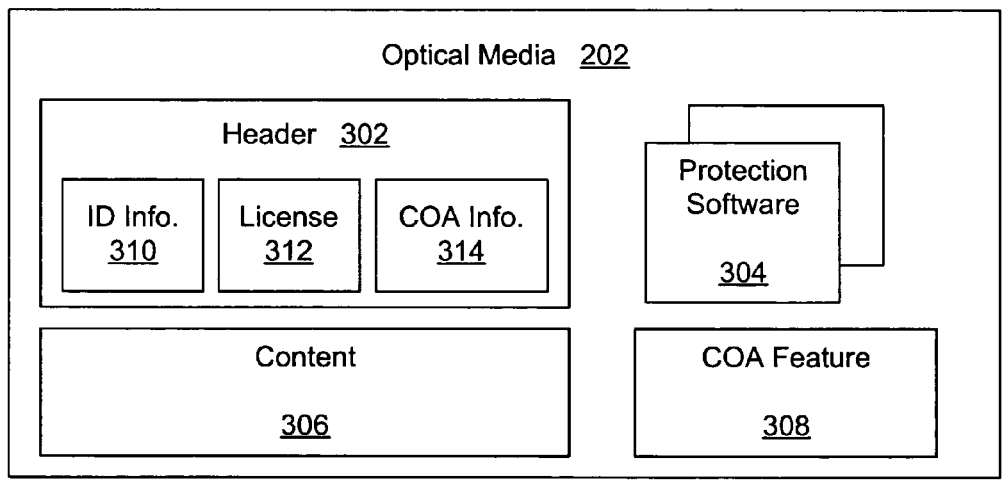
FIG. 3 is a block diagram depicting certain exemplary aspects of the improved optical media suitable for use with the systems in FIGS. 1 and 2, and other like systems/devices.

FIG. 3 is a block diagram depicting certain exemplary aspects of the improved optical media 202 suitable for use with the systems in FIGS. 1 and 2, and other like systems/devices.

Optical media 202 includes header information 302, media/content protection software 304, content 306, and optically-detectable certificate of authentication (COA) feature (s) 308. Header 302 includes, in this example, media identification information 310, license information 312, and COA information 314. Header 302 is configured to convey to device 204, which sections/portions of optical media 202 include content 306 and protection software 304. ID information 310 can be included to uniquely or substantially uniquely identify optical media 202. License information 312 provides information about DRM or other like licenses/licensing applicable to the media itself and/or content 306. COA information 314 provides additional information associated with a COA feature as needed.

COA feature 308 is representative of an optically detectable feature that is unique or at least substantially unique to optical media 202. COA feature 308 in certain implementations includes one or more features that are optically detectable by device 204. COA feature 308 need not be a traditional optical data recording. Indeed, as described in greater detail below, COA 308 may include hardened plastic or epoxy droplets that are applied to a portion of optical media 202 and detectable using conventional and/or special purpose optical emission/detection circuitry (e.g., lasers, LEDs, related circuitry, etc.).

One basic desire is to have COA feature 308 substantially unique and robust enough so as to allow device 204 to detect it and, based on information collected about it during detection, determine if optical media 202 is authentic/verified in some way. This determination may then be used to increase confidence in media 202 and/or data stored thereon, control access to content 306, support other trust-based processes, improved DRM schemes, etc.

Figure 4:
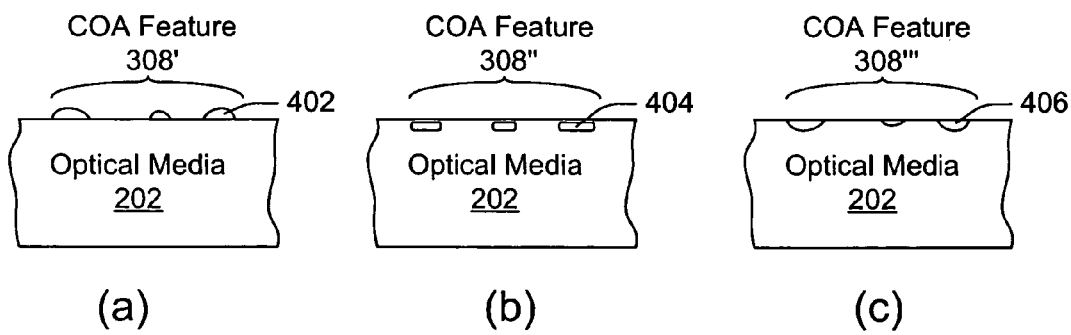
FIGS. 4(a-c) are illustrative cross-sectional diagrams depicting certain features of the improved optical media as in FIG. 3, for example.

With this in mind, FIGS. 4(a-c) are illustrative cross-sectional diagrams depicting certain exemplary types or arrangements of COA features 308. In FIG. 4(a) optical media 202 includes a COA feature 308' having one or more optically-detectable features 402 that are formed on a surface of optical media 202. This can be accomplished, for example, by spraying or otherwise applying droplets of plastic (e.g., polymer), epoxy, glue, paint, dye, or other type of opaque or partially opaque material to a portion of the top surface of optical media 202. In certain implementations it may also be possible to use an optically transparent material that results in an optically-detectable feature/interface. FIG. 4(b) depicts COA feature 308" having one or more optically-detectable features 404 that are formed below the top surface of optical media 202. Features 404 may include, for example, materials and/or topologies that are optically-detectable by device 204. FIG. 4(c) depicts COA feature 308'" having one or more optically-detectable features 406 that are formed so as to extend into at least a portion of the top surface of optical media 202. Features 406 may include, for example, materials and/or topologies that are optically-detectable by device 204. In certain implementations, for example, features 406 may include etched features that are optically detectable.

As illustrated in the examples in FIG. 4, COA features may include a variety of optically-detectable features. When it is desired that COA feature 308 be unique or substantially unique, and/or otherwise difficult to copy or reproduce, then the pattern and/or shape of the feature may be randomly produced by spraying, misting, splattering, etc., some material in liquid form.

By way of example, techniques developed in the Cold War to track and account for nuclear warheads and missiles can be adapted for use in forming COA feature 308. Inspectors developed a technique for verifying each item that was tracked as part of treaties by spraying an area of the item with an epoxy. Once hardened, a photographic image was taken of the epoxy spray pattern. Subsequently taken photographs were then visually compared (e.g., a negative to positive comparison) to determine if the item had been altered or switched. It is believed that replicating such a random spray pattern and resulting hardened droplets would be significantly difficult if not impossible given that the optical reflection produced by the pattern and captured by the photographs at different times are being carefully compared.

This type of idea is adapted to optical data storage mediums in accordance with certain implementations. Rather than requiring human interaction and visual photographic analysis, COA feature 308 are designed to be detected by device 204 using conventional light emitting and detecting circuitry techniques. Thus, for example, the output of an LED or a laser may be directed towards COA feature 308 and light detectors employed to determine reflected light levels/etc. (or lack thereof) returning from COA feature 308 and/or surrounding regions.

Figure 9:
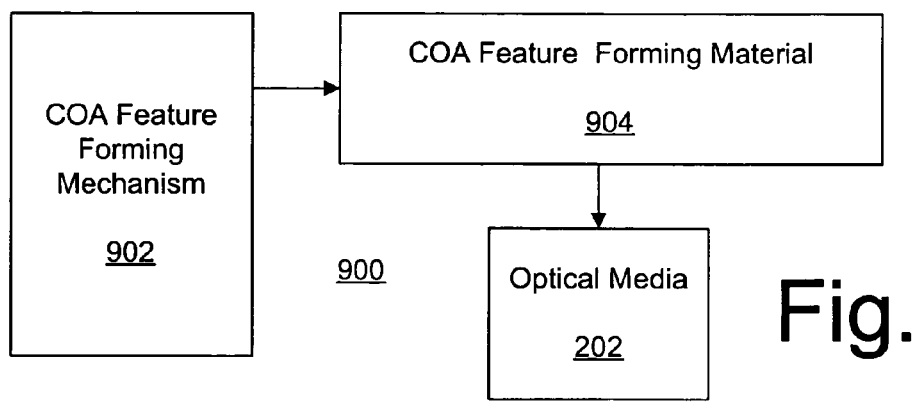
FIG. 9 is a block diagram of a representative apparatus configured to create optically detectable certificate of authenticity (COA) features on improved optical media as in FIGS. 3-4, for example.

Features 402, 404 and/or 406 and others like them can be formed during the manufacture of optical media 202. For example, attention is drawn to FIG. 9, which illustrates a system 900 having a COA feature forming mechanism 902 that controls the application of a COA feature forming material 904 to optical media 202. Those skilled in the art will recognize that the application of COA feature forming material 904 may occur in a variety of ways depending on the material, temperature, location on media 202, etc. Note that in certain implementations COA feature forming material 904 may add material to media 202, change material that is part of media 202, and/or cause material in media 202 to be removed. In certain implementations, COA feature forming material 904 may include liquid and/or solid materials applied separately or together and or at varying temperatures.

Figure 5:
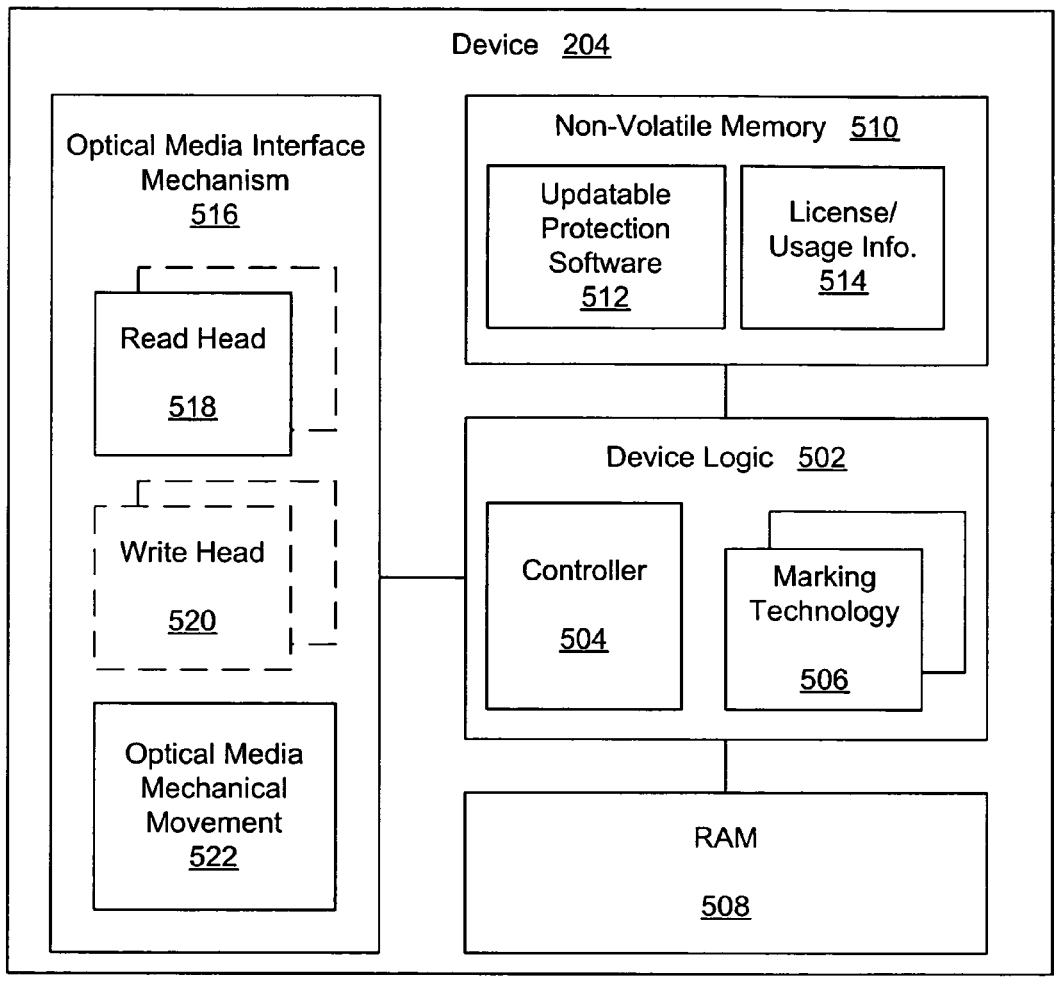
FIG. 5 is a block diagram depicting a device as in FIG. 2, for example, for use with the improved optical media of FIG. 3.

Attention is drawn next to FIG. 5, which is a block diagram depicting an exemplary implementation of device 204 in greater detail. Device 204 includes device logic 502, which in this example, includes a controller 504 and marking technology logic 506. Controller 504 may include a central processing unit (CPU) or like programmable logic. Marking technology 506 includes logic that used to support marking or other types of DRM, copyright protection, processes and the like.

As shown, device logic 502 is operatively coupled to RAM 508 and non-volatile memory 510 in this example. RAM 508 is used, for example, to support reading and writing processes associated with optical media 202. Non-volatile memory 510 is employed to persist data storage associated with protection software 304, license 312 and other similar processes that are part of the protection or DRM scheme provided by device 204 and/or optical media 202. In certain examples, non-volatile memory 510 include FLASH memory, SRAM, etc., that is configured to maintain information such as updatable protection software 512 and/or license/usage information 514. Thus, for example, device logic 502 can be programmed using information (e.g., the data, instructions, etc.) stored in non-volatile memory 510 and device logic 502 can update information stored in non-volatile memory 510 based on protection software 304, header 302, COA feature 308, and/or content 306, as applicable to support adherence to a desired/required DRM scheme.

Device logic 502 is also operatively coupled to an optical media interface mechanism 516, which is illustrated in this exemplary implementation as having at least one read head 518. Read head 518 is representative of the circuitry and mechanism that allows for the reading of data stored on optical media 202 and also for the detection of COA feature 308, if applicable. Read head technology is well-known. In certain implementations, multiple read heads 518 may be used; this too is well-known. Optical media interface mechanism 516 may also include one or more write heads 520. In certain implementations, read and write head technology may be combined into one unit. Also included in optical media interface mechanism 516 is an optical media mechanical movement unit 522, which is configured to receive, move (as necessary), and eject optical media 202 accordingly. Thus, for example, optical media mechanical movement unit 522 may include a tray, holder, spindle motor, etc., as needed to handle optical media 202. Again, such technologies are well-known.

Figure 6:
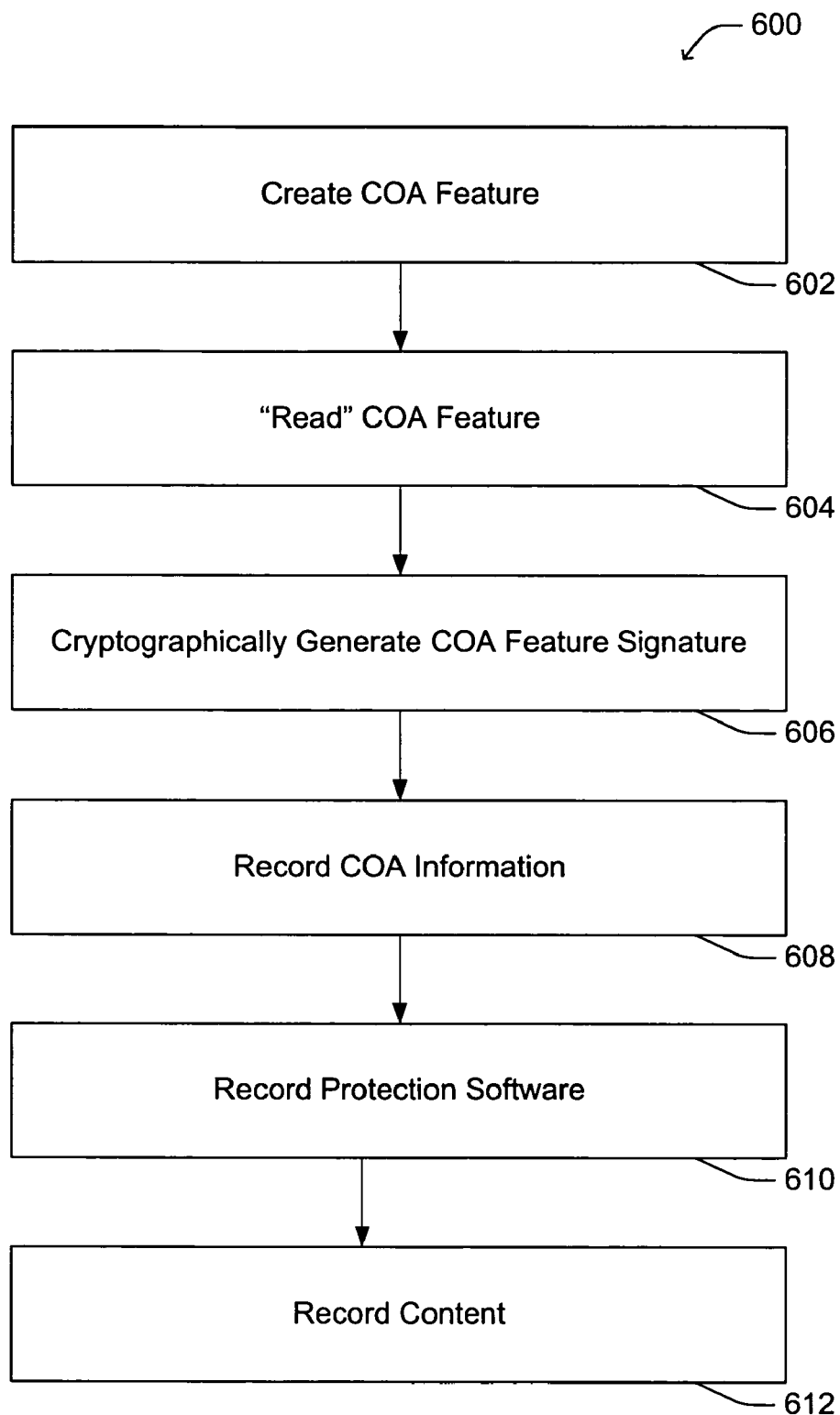
FIG. 6 is a flow diagram depicting certain exemplary acts associated with a method for creating an improved optical media as in FIG. 3, for example.

FIG. 6 depicting certain exemplary acts associated with a method 600 for creating an improved optical media as in FIG. 3, for example. In act 602, a COA feature 318 is created, for example, as previously described. Next, in act 604, the COA feature created in act 602 is optically detected or "read" in a manner that produces information (here, e.g., a signal and/or data) corresponding to the detected/observed optical/light reflective properties of COA feature 318. The raw COA information (e.g., plaintext) data in act 604 may be gathered, for example, by a read head passing COA feature 318.

In act 606, all or part of the information from act 604 is used to generate a corresponding COA feature signature. Act 606, for example, in certain implementations and as described in greater detail below uses cryptographic algorithms to generate the COA feature signature. Next, in act 608, COA information 314 is recorded or otherwise stored to optical media 202. In certain implementations, for example, COA information 314 may include the COA feature signature from act 606 and the plaintext from act 604. In act 610, if optical media 202 is to include updated protection software 304, then this is also recorded or otherwise stored in optical media 202. In act 612, content data 306 is recorded or otherwise stored to optical media 202.

Note that the acts in method 600 may be rearranged accordingly. Also, it should be recognized that while in certain implementations data may be written to the optical medium, for example, using a write head, in other implementations the optical medium may be manufactured to have data already stored thereon. These techniques and others like them are also well-known.

Figure 7:
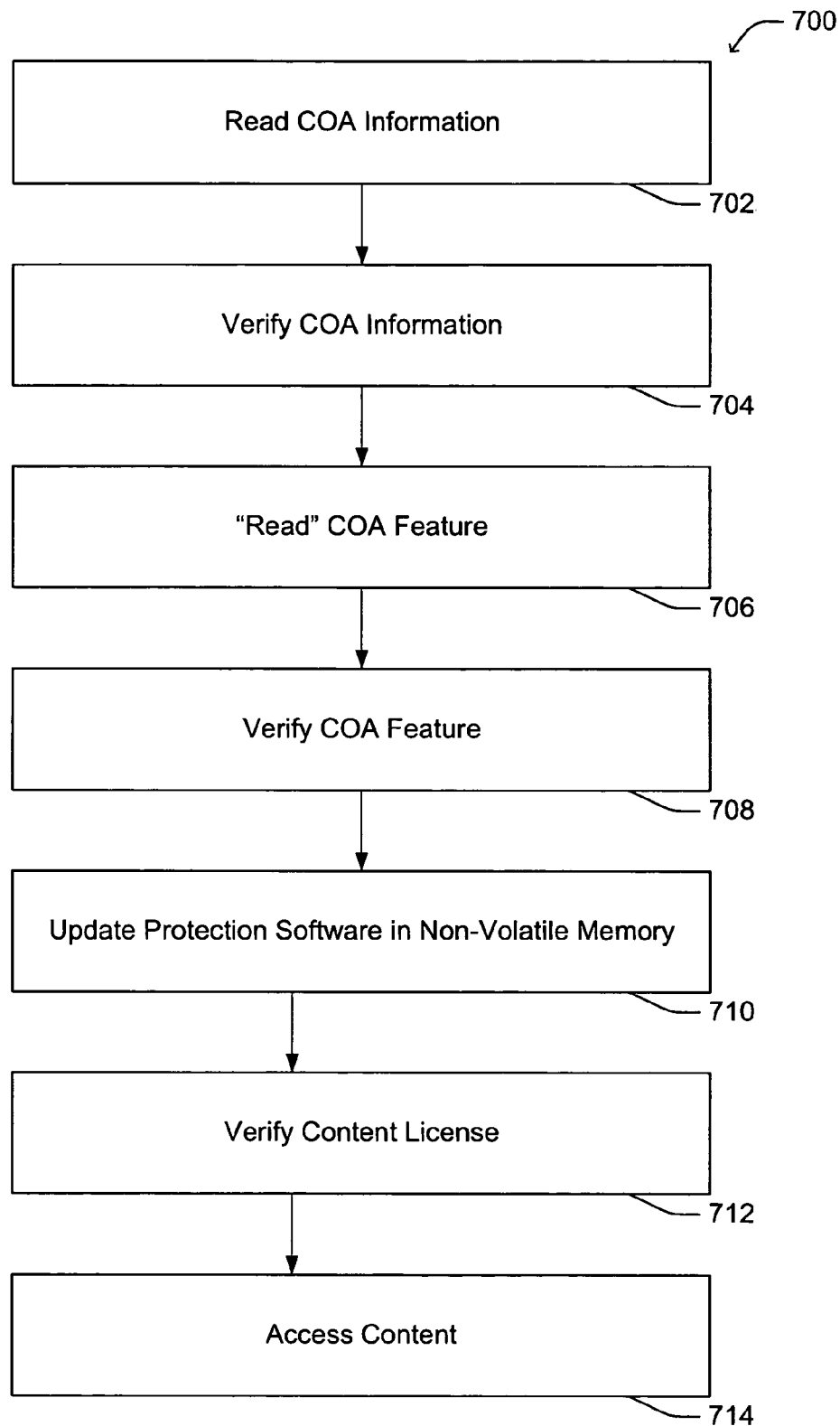
FIG. 7 is a flow diagram depicting certain exemplary acts associated with a method for using an improved optical media as in FIG. 3, for example.

FIG. 7 depicts certain exemplary acts associated with a method 700 for using an improved optical media as in FIG. 3, for example. Here, in act 702, COA information 314 is read. In act 704 the COA information is verified. Act 702 essentially, verifies that the COA information is valid. An example of a verification process is described and shown below with regard to FIG. 8.

Next, in act 706, COA feature 318 is "read", and in act 708 the COA feature is verified. In the example, of FIG. 8, the verification of the COA feature is based on a comparison to part of the verified COA information.

With the verification in acts 704 and 706 satisfied, then in act 710, any update to protection software 304/512 is completed. Then, with the current updated protection software operating, in act 712, any license(s) required for accessing/processing the desired content 306 can be verified or otherwise handled. Act 712, for example, may include adding or modifying license/usage information 514 in non-volatile memory 510 of device 204. Consequently, device logic 502 may keep track of usage/access to content 306, and/or adhere to or enforce DRM or other like schemes as provided for in the protection software.

Figure 8:
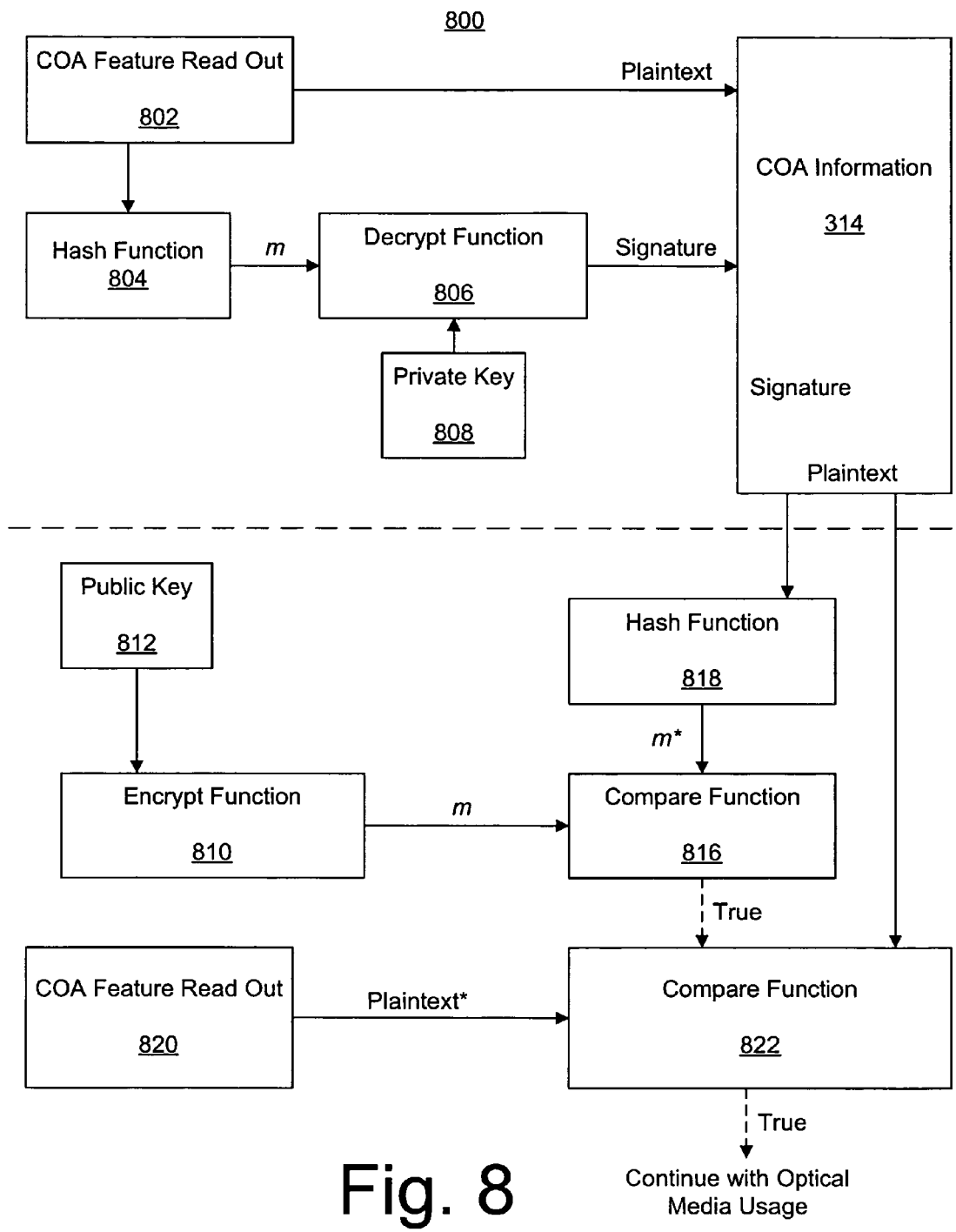
FIG. 8 is a block diagram depicting certain exemplary functions associated with the creation and usage of an improved optical media as in FIG. 3, for example.

Attention is now drawn to FIG. 8, which is a block diagram depicting certain exemplary functions associated with the creation and usage of an improved optical media as in FIG. 3, for example. Arrangement 800 includes two sections that are illustrated as being above and below a dashed line. The functions above the dashed line would likely occur during manufacture of optical media 202 and the functions below the dashed line would likely occur during typical use of the resulting optical media. Note the not all data recording acts are depicted.

A COA feature read out 802 is performed (e.g., as in act 604). The resulting plaintext is included in COA information 314 and also provided to a hash function 804. Hash function 804 cryptographically hashes the plaintext to produce message "m". By way of example, hash function 804 (and hash function 818) may use a SHA1 or other like hash functions.

Message m is then processed using a decrypt function 806. In this example, decrypt function 806 uses a private key 808 associated with the digital rights holder, copyright holder, media manufacturer, publisher, user, and/or other applicable entity. In certain implementations, for example, decrypt function 806 (and an encrypt function 810) may use RSA or other like cryptography techniques. The resulting signature from decrypt function 806 is included in COA information 314.

Below the dashed line, when the optical medium is being initially read, the signature is accessed from COA information 314 and processed by encrypt function 810 to reproduce message "m". Here, for example, a public key corresponding to private key 808 may be used. The plaintext from COA information 314 is processed by a hash function 818 producing message "m*". To verify that COA information 314 is authentic, a compare function 816 is performed with messages m and m* as inputs. If messages m and m* match (=true) per compare function 818, then COA information 314 is deemed verified in this example.

Having verified COA information, the COA feature can then be "read" and compared to the COA information. This is illustrated by a COA feature read out 820, which produces plaintext* as an output. Plaintext from COA information 314 is then compared to plaintext* in a compare function 822. If compare function 822 determines that plaintext and plaintext* "match" (e.g., are sufficiently alike) then the verification of optical media 202 is complete and other processes may continue to consider license 312, or other like requirements, and/or proceed to access content 306.

Note that in certain implementations, it may be difficult to have an exact mathematical match occur in compare function 822 given the number of variables associated with "reading" certain types of COA features. Thus, in certain implementations, something less than an exact match may qualify as a "match". For example, in certain implementations, a threshold-based or other like percentage-based matching/comparison function may be employed to allow for a certain level of deviation in the COA feature "read" data. In certain implementations, for example, a hamming distance threshold may be used.

Attention is now drawn to FIG. 10, which is an illustrative diagram depicting a conventional optical media in the form of a disc 1000. Disc 1000 may, for example, be a prior art CD, DVD, etc. Here, in this example, disc 1000 includes spindle mounting hole 1002, a non-data region 1004, an indexing data region 1006, and a content data region 1008. Indexing data region 1006 is representative of any type of data/information that may be needed to identify the layout of disc 1000 and in particular the data in content data region 1008. Those skilled in the art will recognize that other regions and/or data may also be included, and that the exemplary layout shown in FIG. 10 is illustrative only and that an actual physical layout of such data/regions may take various forms as allowed under applicable standards/formats. Also, those skilled in the art will recognize that a block of data may be written/stored in one contiguous section on disc 1000 or in some manner sub divided and written/stored in a plurality of different sections on disc 1000.

FIGS. 11(*a-c*) are similar illustrative diagrams depicting certain exemplary improved optical media implementations in the form of discs 1100, 1100', and 1100", respectively. These are only a few illustrative examples.

In FIG. 11(*a*), for example, disc 1100 includes spindle mounting hole 1002, non-data region 1004, and indexing data region 1006. Disc 1100 also includes content 306. Header 302 is included within indexing data region 1006, in this example, with data as applicable to protection software 304, which is also included in disc 1100.

In FIG. 11(*b*), for example, disc 1100' also includes spindle mounting hole 1002, non-data region 1004, and indexing data region 1006. Disc 1100' further includes content 306 and COA feature 308. Header 302 is also included within indexing data region 1006, in this example. Header 302 includes data applicable to COA feature 308.

In FIG. 11(*c*), for example, Disc 1100" also includes spindle mounting hole 1002, non-data region 1004, and indexing data region 1006. Disc 1100" further includes content 306, protection software 304, and COA feature 308. Header 302 is also included within indexing data region 1006, in this example. Here, header 302 includes data applicable to protection software 304 and COA feature 308.

Although some preferred embodiments of the various methods and apparatuses of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. An optical data storage medium comprising:
    a memory;
    one or more processors operatively coupled to the memory and disposed within one or more devices;
    optically-readable material suitable for storing data therein;
    stored within said optically-readable material, instructional data for an optical media content protection scheme, said instructional data being configured to cause logic associated with an optical media receiving device to operatively perform in accordance with said optical media content protection scheme when programmed using said instructional data and accessing associated content data stored on said optical data storage medium,
    at least one optically-detectable authentication component,
    wherein said at least one optically-detectable authentication component includes a plurality of optically-detectable authentication components forming a substantially unique pattern using at least one optically detectable material,
    wherein said optically detectable material includes at least one material selected from a group of optically detectable materials comprising an opaque material, a partially opaque material, a polymer-based material, and an epoxy-based material,
    wherein said at least one optically-detectable authentication component forms an optically-detectable certificate of authentication (COA);
    stored within said optically-readable material, COA information data, said COA information data including at least one type of data associated with said COA selected from a group of COA information data comprising raw optically-detected COA data, COA related plaintext data, and COA related signature data; and
    at least one top surface material, wherein said at least one optically-detectable authentication component is formed on said top surface material.

2. The optical data storage medium as recited in claim 1, wherein said optical media content protection scheme includes a digital rights management (DRM) protection scheme.

3. The optical data storage medium as recited in claim 2, wherein said DRM protection scheme includes at least one marking scheme selected from a group of marking schemes comprising a data-implemented water marking scheme and a data-implemented forensic marking scheme.

4. The optical data storage medium as recited in claim 1, further comprising at least one type of additional data stored within said optically-readable material, wherein said type of additional data is selected from a group of additional data comprising substantially unique identifier data associated with said optical data storage medium, licensing data associated with said optical data storage medium, and said content data.

5. The optical data storage medium as recited in claim 1, further comprising:
    at least one top surface material and wherein at least one of the following occurs:
        said at least one optically-detectable authentication component is formed below said top surface material; and
        said at least one optically-detectable authentication component extends at least partially into said top surface material.

6. An apparatus comprising:
    a memory;
    one or more processors operatively coupled to the memory and disposed within one or more devices;
    means for storing instructional data for an optical media content protection scheme within an optical data storage medium, said instructional data being configured to cause logic associated with an optical media receiving device to operate in accordance with said optical media content protection scheme when programmed using said instructional data and accessing associated content data stored on said optical data storage medium;
    means for causing at least one optically-detectable authentication component to be included in said optical data storage medium, wherein said optically-detectable authentication component includes a plurality optically-detectable authentication components forming a substantially unique pattern using at least one optically detectable material, wherein said at least one optically-detectable authentication component forms an optically-detectable certificate of authentication (COA), wherein said optically detectable material includes at least one material selected from a group of optically detectable materials comprising an opaque material, a partially opaque material, a polymer-based material, and an epoxy-based material;
    means for storing COA information data within said optical data storage medium and
    means for generating said COA information data, wherein said COA information data includes at least one type of data associated with said COA selected from a group of COA information data comprising raw optically-detected COA data, COA related plaintext data, and COA related signature data; and means for at least one top surface material, wherein said at least one optically-detectable authentication component is formed on said top surface material.

7. The apparatus as recited in claim 6, wherein said optical media content protection scheme includes a digital rights management (DRM) protection scheme.

8. The apparatus as recited in claim 7, wherein said DRM protection scheme includes at least one marking scheme selected from a group of marking schemes comprising a data-implemented water marking scheme and a data-implemented forensic marking scheme.

9. The apparatus as recited in claim 6, further comprising:
means for storing at least one type of additional data within said optical data storage medium, said type of additional data being selected from a group of additional data comprising substantially unique identifier data associated with said optical data storage medium, licensing data associated with said optical data storage medium, and said content data.

10. The apparatus as recited in claim 6, further comprising:
wherein said optical data storage medium includes at least one top surface material, and further comprising at least one means for causing at least one of the following functions to occur:
forming at least one optically-detectable authentication component below said top surface material; and
forming said at least one optically-detectable authentication component such that said at least one optically-detectable authentication component extends at least partially into said top surface material.

11. An apparatus comprising:
a memory;
one or more processors operatively coupled to the memory and disposed within one or more devices;
a data storage device configurable to write data to an optical data storage medium; and
logic operatively coupled to said configured data storage device and configured to cause said data storage device to record instructional data for an optical media content protection scheme within said optical data storage medium, said instructional data being configured to cause logic associated with an optical media receiving device to operate in accordance with said optical media content protection scheme when programmed using said instructional data and accessing associated content on said an optical data storage medium,
wherein said optical data storage medium further includes a plurality of optically-detectable authentication components forming a substantially unique pattern using at least one optically detectable material and an optically-detectable certificate of authentication (COA),
wherein said optically detectable material includes at least one material selected from a group of optically detectable materials comprising an opaque material, a partially opaque material, a polymer-based material, and an epoxy-based material,
wherein said logic is further configured to cause said data storage device to record COA information data within said optical data storage medium,
wherein said COA information data includes at least one type of data associated with said COA selected from a group of COA information data comprising raw optically-detected COA data, COA related plaintext data, and COA related signature data; and
at least one top surface material, wherein said at least one optically-detectable authentication component is formed on said top surface material.

12. The apparatus as recited in claim 11, wherein said optical media content protection scheme includes digital rights management (DRM) protection scheme.

13. The apparatus as recited in claim 12, wherein said DRM protection scheme includes at least one marking scheme selected from a group of marking schemes comprising a data-implemented water marking scheme and a data-implemented forensic marking scheme.

14. The apparatus as recited in claim 11, wherein said logic is further configured to cause said data storage device to record at least one type of additional data within said optical data storage medium, said type of additional data being selected from a group of additional data comprising substantially unique identifier data associated with said optical data storage medium, licensing data associated with said optical data storage medium, and content data.

15. The apparatus as recited in claim 11, wherein said data storage device is further configurable to detect said at least one optically-detectable authentication component and provide resulting authentication component information to said logic.

16. One or more computer readable media storing computer-executable instructions that, when executed, perform a method comprising:
storing instructional data for an optical media content protection scheme within an optical data storage medium, said instructional data being configured to cause logic associated with an optical media receiving device to operate in accordance with said optical media content protection scheme when programmed using said instructional data and accessing associated content data stored on said optical data storage medium;
causing at least one optically-detectable authentication component to be included in said optical data storage medium, wherein said optically-detectable authentication component includes a plurality of optically-detectable authentication components forming a substantially unique pattern using at least one optically detectable material,
wherein said plurality of optically-detectable authentication components includes at least one optically-detectable authentication component forming a substantially unique pattern using at least one optically detectable material,
wherein said optically detectable material includes at least one material selected from a group of optically detectable materials comprising an opaque material, a partially opaque material, a polymer-based material, and an epoxy-based material,
wherein said at least one optically-detectable authentication component forms an optically-detectable certificate of authentication (COA);
storing COA information data within said optical data storage medium, wherein said COA information data includes at least one type of data associated with said COA selected from a group of COA information data comprising raw optically-detected COA data, COA related plaintext data, and COA related signature data; and
generating said COA information data.

17. The method as recited in claim 16, wherein said optical media content protection scheme includes a digital rights management (DRM) protection scheme.

18. The method as recited in claim 17, wherein said DRM protection scheme includes at least one marking scheme selected from a group of marking schemes comprising a data-implemented water marking scheme and a data-implemented forensic marking scheme.

19. The method as recited in claim 16, further comprising:
storing at least one type of additional data within said optical data storage medium, said type of additional data being selected from a group of additional data comprising substantially unique identifier data associated with said optical data storage medium, licensing data associated with said optical data storage medium, and said content data.

20. The method as recited in claim 16:
wherein said optical data storage medium includes at least one top surface material, causing at least one of the following acts to occur:
forming at least one optically-detectable authentication component below said top surface material; and
forming said at least one optically-detectable authentication component such that said optically-detectable authentication component extends at least partially into said top surface material.

21. A computer-readable medium storing computer-implementable instructions for causing at least one processor to perform acts comprising:
writing instructional data for an optical media content protection scheme to an optical data storage medium, said instructional data being configured to cause logic associated with an optical media receiving device to operate in accordance with said optical media content protection scheme when programmed using said instructional data and accessing associated content data stored on said optical data storage medium, wherein said optical data storage medium further includes at least one optically-detectable authentication component;
wherein said optical data storage medium further includes at least one optically-detectable authentication component forming a substantially unique pattern using at least one optically detectable material and an optically-detectable certificate of authentication (COA),
wherein said optically detectable material includes at least one material selected from a group of optically detectable materials comprising an opaque material, a partially opaque material, a polymer-based material, and an epoxy-based material,
wherein said logic is further configured to cause said data storage device to record COA information data within said optical data storage medium,
wherein said COA information data includes at least one type of data associated with said COA selected from a group of COA information data comprising raw optically-detected COA data, COA related plaintext data, and COA related signature data;
at least one top surface material, wherein said at least one optically-detectable authentication component is formed on said top surface material writing COA information data to said optical data storage medium, wherein said COA information data includes at least one type of data associated with said COA selected from a group of COA information data comprising raw optically-detected COA data, COA related plaintext data, and COA related signature data; and
generating said COA information data.

22. The computer-readable medium as recited in claim 21, wherein said optical media content protection scheme includes a digital rights management (DRM) protection scheme.

23. The computer-readable medium as recited in claim 22, wherein said DRM protection scheme includes at least one marking scheme selected from a group of marking schemes comprising a data-implemented water marking scheme and a data-implemented forensic marking scheme.

24. The computer-readable medium as recited in claim 21, further comprising:
writing at least one type of additional data to said optical data storage medium, said type of additional data being selected from a group of additional data comprising substantially unique identifier data associated with said optical data storage medium, licensing data associated with said optical data storage medium, and said content data.

25. An apparatus comprising:
non-volatile memory;
an interface mechanism suitable for receiving a removable optical data storage medium, accessing instructional data associated with an optical media content protection scheme from said optical data storage medium, and outputting said accessed instructional data;
logic operatively coupled to said interface mechanism and said non-volatile memory and configured to receive said accessed instructional data and in response thereto update a current optical media content protection scheme stored in said non-volatile memory and thereafter while accessing associated content data stored on said optical data storage medium operatively adhere to said updated current optical media content protection scheme,
wherein said interface mechanism is further configured to detect at least one optically-detectable authentication component that is part of said optical data storage medium and output corresponding information to said logic,
wherein said optical data storage medium further includes at least one optically-detectable authentication component forming a substantially unique pattern using at least one optically detectable material and an optically-detectable certificate of authentication (COA),
wherein said interface mechanism is further configured to access COA information data stored within said optical data storage medium and provide said COA information data to said logic,
wherein said optically detectable material includes at least one material selected from a group of optically detectable materials comprising an opaque material, a partially opaque material, a polymer-based material, and an epoxy-based material,
wherein said logic is further configured to cause said data storage device to record COA information data within said optical data storage medium,
wherein said COA information data includes at least one type of data associated with said COA selected from a group of COA information data comprising raw optically-detected COA data, COA related plaintext data, and COA related signature data;
at least one top surface material, wherein said at least one optically-detectable authentication component is formed on said top surface material,
wherein said logic is further configured to verify said COA information data, and is configured to update said current optical media content protection scheme stored in said non-volatile memory once said COA information data has been verified.

26. The apparatus as recited in claim 25, wherein said current optical media content protection scheme causes said logic to adhere to a digital rights management (DRM) protection scheme.

27. The apparatus as recited in claim 26, wherein said DRM protection scheme includes at least one marking scheme selected from a group of marking schemes comprising a data-implemented water marking scheme and a data-implemented forensic marking scheme.

28. The apparatus as recited in claim 25, wherein said interface mechanism is further configured to access and output to said logic at least one type of additional data stored on said optical data storage medium, said type of additional data being selected from a group of additional data comprising substantially unique identifier data associated with said optical data storage medium, licensing data associated with said optical data storage medium, and said content data.

29. The apparatus as recited in claim 25, wherein said interface mechanism is further configured to access license information data stored within said optical data storage medium and provide said license information data to said logic, and wherein said logic is configured to verify said license information data to determine if content data stored on said optical data storage medium can be accessed.

30. The apparatus as recited in claim 29, wherein said logic maintains license usage information within said non-volatile memory.

\* \* \* \* \*